May 13, 1969 S. W. LIDDLE ET AL 3,443,767

ENDLESS LOOP TAPE CARTRIDGE

Filed Jan. 20, 1967

INVENTORS
Stephen W. Liddle
& Clarence E. Bush
BY Eugene M. Whitacre
Attorney 3,443,767

ENDLESS LOOP TAPE CARTRIDGE

Stephen W. Liddle and Clarence E. Bush, Indianapolis, Ind., assignors to Radio Corporation of America, a corporation of Delaware Filed Jan. 20, 1967, Ser. No. 610,668
Int. Cl. B65h *17/48*
U.S. Cl. 242—55.19 2 Claims

ABSTRACT OF THE DISCLOSURE

A thin annular wafer formed of a flexible material is interference fitted on the hub portion of a reel of tape disposed in an endless loop tape cartridge to keep the innermost tape convolutions adjacent the hub portion from rising above the tape roll and jamming the cartridge. The wafer is shaped to provide a tape egress opening and guide at a predetermined position relative to the hub portion such that during operation of the cartridge, the wafer is caused to flex and provide more clearance for the tape to escape at the egress point.

This invention relates to tape cartridges, and more particularly to tape cartridges adapted for use with an endless loop of magnetic tape.

In a tape cartridge containing an endless loop of magnetic tape spirally wound around the hub of a reel or turntable, it has been found desirable to provide a certain amount of slack or looseness in the tape loop. This has the advantage of reducing the friction between adjacent convolutions in the tape roll, thereby improve the wow and flutter characteristics of the cartridge during playback operation. Due to the slack in the tape loop, there are conditions which may occur, such as when the cartridge is subjected to vibration or accidently dropped, wherein the turns of tape adjacent to the innermost turn at the hub come loose, rise, and enter into a clearance area between the top of the hub and the upper part of the cartridge case. Under such conditions, it is virtually impossible to pull the inside tape turn free with the result that the tape may wrinkle causing jamming of the cartridge or breaking of the tape.

While some endless loop cartridges may contain a rigid annular disc disposed around the hub and close to the top surface of the tape roll, present manufacturing costs prohibit hub and disc tolerances tight enough to insure that the clearance between the rigid annular disc and the hub is small enough to prevent the innermost turns of tape near the hub from rising and coming free from the roll of tape.

Still other endless loop cartridges contain a thin flexible annular wafer press fitted on the hub and seated on top of the tape roll beneath a rigid annular disc to constrain the turns of tape adjacent the innermost turn of tape on the hub within the body of the tape roll. During the assembly of the cartridge, the tape must be threaded through the extra wafer prior to splicing the free ends of the tape, thereby increasing the complexity and cost of manufacture of the cartridge.

It is an object of the present invention to provide an improved endless loop tape cartridge in which the innermost turns of tape adjacent the hub are prevented from rising from their normal position, but in which the innermost turn of tape is free to unwind from the hub during operation of the cartridge, while at the same time providing a cartridge of simplified construction which is relatively economical to manufacture.

In accordance with the present invention, an endless loop tape cartridge which includes a roll of magnetic tape spirally wound about the hub of a rotatable tape reel is provided with an annular wafer which is mounted on the upper portion of the hub. The inside diameter of the wafer is dimensioned relative to the diameter of the hub at its mounting position thereon so as to normally provide a close surrounding fit of the wafer on the hub. The wafer includes a clearance area between it and the hub to permit egress of the tape from around the hub and through the clearance area during operation of the cartridge.

The novel features which are considered to be characteristic of the invention are set forth with particularity in the appended claims. The invention itself, however, both as to its organization and method of operation as well as additional objects and advantages thereof, will best be understood from the following description when read in connection with the accompanying drawing in which:

Figure 1:
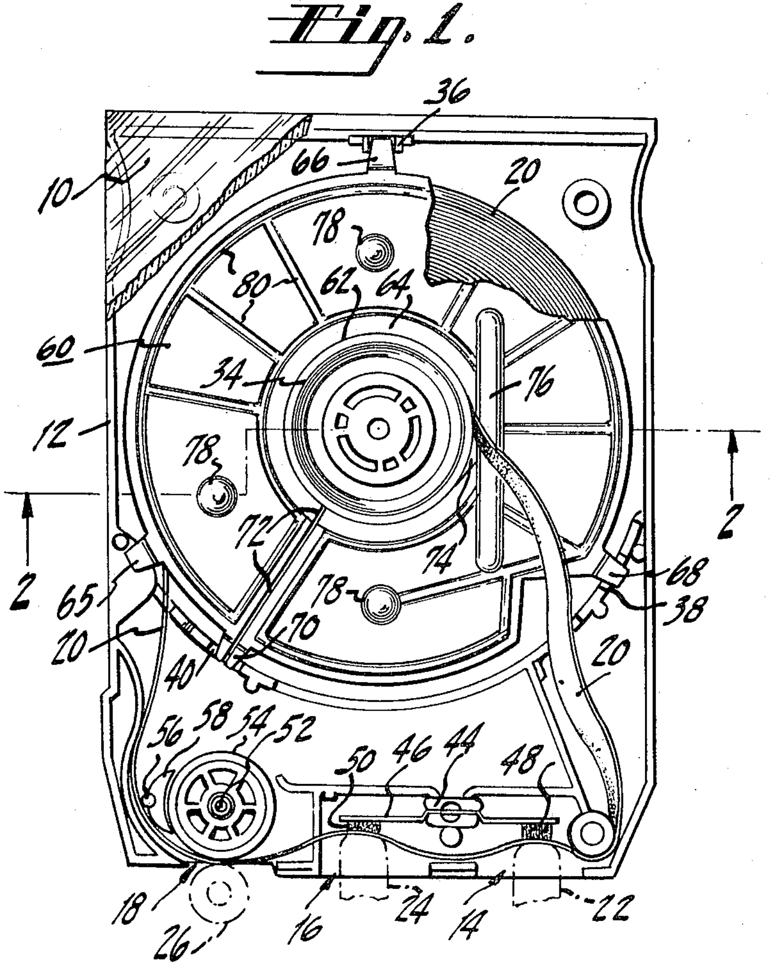
FIGURE 1 is a plan view partially broken away of an endless loop tape cartridge embodying the invention.

Referring to the drawings wherein like reference numerals will be used to designate like parts in the various figures, the tape cartridge includes a rectangularly shaped casing having complementary top 10 and bottom 12 cover portions. The front of the cartridge has three rectangular apertures 14, 16 and 18 extending from right to left as viewed in FIGURE 1. Apertures 14, 16 and 18 allow a magnetic tape 20 to be exposed to operative contact with an erase or track sensing head 22, record-playback head 24, and drive capstan 26 respectively, of an associated record-playback apparatus, not shown, when the cartridge is inserted into the apparatus as will be hereinafter described.

Figure 2:
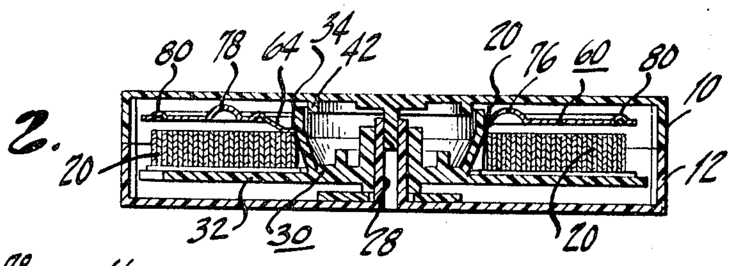
FIGURE 2 is a sectional view in elevation of the cartridge taken on line 2—2 of FIGURE 1.

As shown more particularly in FIGURE 2, an upright spindle 28 on the bottom portion 12 of the casing serves as a bearing for a rotatable tape reel or turntable 30. The tape reel 30 includes a circular bottom plate 32 and an integrally formed tapered hub 34 about which the magnetic tape 20 is spirally wound. The spiral roll of tape 20 is constrained within the circumferential area bounded by the plate 32 by means of a flange (not shown) on the underside of the top portion of the casing 10 which extends downwardly around the outer periphery of the tape roll and by means of notched standoffs 36, 38 and 40 projecting upwardly from the bottom portion of the casing.

The casing cover member includes an annular flange or guard rail 42 (FIGURE 2) which depends downwardly within the casing and concentric with the reel hub portion 34. The rail 42 serves to prevent the tape turns from crossing over along the top surface of the hub and jamming the cartridge.

Upstanding from the bottom portion 12 of the casing and spaced in from the front wall is a pillar 44 supporting a spring member 46 having a pair of felt padded arms 48 and 50 in alignment with apertures 14 and 16 respectively. Spaced behind the aperture 18 is an upright post 52 on which a pressure roller 54 is rotatably mounted. Adjacent the pressure roller 54 is another post 56 on which a tape stripping means 58 is journaled.

When the cartridge is inserted into a record-playback apparatus, padded arms 48 and 50 effect a resilient engagement of the exposed tape with the apparatus erase or sensing head 22 and record-playback head 24 respectively, while the roller 54 presses the tape against the capstan 18 to frictionally draw the tape from right to left across the front portion of the cartridge and consequently across the erase and record-playback heads respectively.

In accordance with the present invention, a thin, flat retaining wafer 60 made of a flexible material such as polystyrene plastic, and having a central aperture 62 of a diameter slightly smaller than the largest diameter of the hub 34 and slightly larger than the diameter of the hub in the area of the top edge of the tape roll, is positioned over the hub and between the top edge of the tape roll and the underside of the top cover portion. As shown more particularly in FIGURES 2 and 3, the area of the wafer 60 adjacent the aperture 62 is recessed to provide a dropped center portion 64 which surrounds the hub 34 and provides a snug fit at its mounting position thereon.

A tape restraining tab 65 extends radially out from the left hand edge of the wafer (as viewed in FIGURE 1) and serves to prevent the tape from escaping the boundaries of the tape roll in the area where the tape is rewound on to the reel 30.

Three spaced positioning tab elements 66, 68 and 70 extend radially out from the body of the wafer. The tabs 66, 68 and 70 are loosely fitted in the notched portions of the standoffs 36, 38 and 40 respectively, such that the wafer 60 is suspended above the top edge of the tape roll with its recessed center portion 64 substantially in line with the top edge of the tape roll. A slit 72 extends radially from the central aperture 62 through the tab element 70. The loose fitting of the tab elements where they mate with and are received in the slotted standoffs allow for a slight movement of the wafer in response to rotation of the hub. This movement facilitates a flexure of the wafer and egress of the tape during operation of the cartridge in a manner to be hereinafter described.

Figure 3:
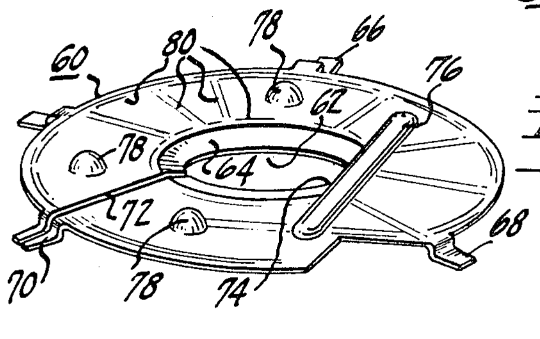
FIGURE 3 is a perspective view of the wafer used in the cartridge of FIGURE 1.

As shown in FIGURES 1 and 3 the inner perimeter of the wafer is eccentrically shaped to provide a tape egress opening 74 in the area where the innermost tape convolution is drawn from around the hub. An elongated ridge or guide bar 76 is integrally formed on the wafer adjacent the egress opening 74. The ridge 76 is positioned such that it provides a supporting surface for the tape 20 as it is drawn from around the hub. In addition to supporting the tape, the ridge serves to equalize the tension in the tape at the point where it passes over the bar. Furthermore, the length of the ridge together with its angular position relative to the point at which the tape 20 is drawn from the hub also serves to minimize the possibility of the tape 20 flipping over under certain conditions, such as when the cartridge is subjected to vibration or accidently dropped. The top surface of the wafer is also formed with a plurality of raised standoffs or nipples 78 which serve to space the wafer from the under side of the cover portion 10 of the cartridge and thereby insure that the wafer tab elements are retained in the slotted standoffs.

Depending upon the nature of the material used in fabricating the wafer, it may be necessary (as shown in FIGURES 1 and 2) to decorate its surface with a web-like arrangement of radially and circumferentially extending ribs 80. The ribs 80 act as a means of sufficiently stiffening the wafer so as to prevent it from sagging and rubbing against the tape roll during operation of the cartridge under abnormally high temperature conditions.

The wafer may be manufactured very easily by vacuum forming and stamping or injection molding.

In assembly of the cartridge, the wafer is interference fitted over the top of the hub and seated such that its recessed or dropped down center portion is adjacent the top edge of the tape roll and the tab elements are received in the slotted standoffs. The interference fit of the wafer over the top of the hub permits a relatively low tolerance to be maintained in its fabrication, while still achieving a close surrounding fit of the wafer in the area adjacent the egress opening.

While it is preferable for the diameter of the wafer aperture to be smaller than the largest diameter of the hub, and slightly larger than the diameter of the hub at a level in line with the top edge of the tape roll, i.e. where the wafer sits, the exact dimensions of the wafer aperture are not critical. The tape egress opening as well as the use of a thin flexible material for the wafer tends to reduce the tolerance requirements of the aperture. During operation of the cartridge and as the tape is drawn from around the hub, the wafer is caused to flex and distort its shape so as to minimize any surface area contact with the hub and/or the top edge of the tape roll while providing more clearance for the innermost convolution of the tape roll to be drawn from the hub at the egress opening. Moreover, the loose fit of the wafer tab elements in the slotted studs provide for a "floating action" of the wafer which further facilitates the flexing and distortion of the wafer to allow for easy tape egress.

It should be noted that the manufacturing cost of an endless loop tape cartridge embodying the wafer of the present invention is considerably less than the cost of prior art cartridges utilizing tight hub and disc tolerances, and/or cartridges utilizing a disc and wafer combination.

What is claimed is:

1. In an endless loop tape cartridge of the type having a rotatable reel containing a roll of tape spirally wound about its hub portion and in which the innermost convolution of the tape is drawn out from around the hub during operation of the cartridge, the improvement comprising:

an annular wafer surrounding the hub, the inside diameter of said wafer being dimensioned relative to the diameter of said hub at its mounting position thereon so as to provide a snug fit, the inner perimeter of said wafer being shaped to provide an eccentric opening adjacent the hub and through which the innermost convolution of the tape is drawn during operation of the cartridge, said wafer being formed of a material capable of sufficient flexure to provide a clearance area between it and said hub to facilitate egress of the tape from around the hub and through said opening during operation of the cartridge, said wafer having at least two tab like elements forming radial extensions thereof and adapted to be received in a portion of said cartridge such that said wafer is suspended above the top of said tape roll, and wherein the central portion of said wafer adjacent said hub is recessed to a level substantially in line with the top edge of said tape roll.

2. An endless loop tape cartridge as defined in claim 1 wherein said reel hub portion is tapered and the inside diameter of said wafer is smaller than the largest diameter of said tapered hub portion and larger than the diameter of said hub at its mounting position therein.

References Cited

UNITED STATES PATENTS

| | | |
|---|---|---|
| 3,030,041 | 4/1962 | Cousino. |
| 3,350,025 | 10/1967 | Lear. |

FOREIGN PATENTS

| | | |
|---|---|---|
| 1,001,967 | 8/1965 | Great Britain. |

BILLY S. TAYLOR, *Primary Examiner.*